US007722184B2

(12) United States Patent
Yamada et al.

(10) Patent No.: US 7,722,184 B2
(45) Date of Patent: May 25, 2010

(54) INDICATOR MOUNTING STRUCTURE AND IMAGE FORMING APPARATUS INCLUDING THE SAME

(75) Inventors: Kazuyoshi Yamada, Kanagawa (JP); Tamaki Someya, Saitama (JP); Shigeru Horiguchi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 708 days.

(21) Appl. No.: 11/253,545

(22) Filed: Oct. 20, 2005

(65) Prior Publication Data

US 2006/0103858 A1 May 18, 2006

(30) Foreign Application Priority Data

Nov. 2, 2004 (JP) ............................. 2004-318669

(51) Int. Cl.

*B41J 29/13* (2006.01)
*B41J 2/325* (2006.01)
*B41J 2/435* (2006.01)
*G01D 15/06* (2006.01)

(52) U.S. Cl. ....................... 347/108; 347/170; 347/222; 347/245; 347/263

(58) Field of Classification Search ................. 347/108, 347/170, 222, 245, 263; 346/145; 400/691, 400/693, 694

See application file for complete search history.

(56) References Cited

U.S. PATENT DOCUMENTS

| | | | | |
|---|---|---|---|---|
| 2,116,471 | A * | 5/1938 | Nelson | 40/615 |
| 6,065,831 | A * | 5/2000 | Kawaura et al. | 347/108 |
| 6,226,475 | B1 | 5/2001 | Kabumoto et al. | |
| 6,259,866 | B1 | 7/2001 | Kabumoto et al. | |
| 6,389,249 | B2 | 5/2002 | Kabumoto et al. | |
| 6,396,410 | B1 | 5/2002 | Kabumoto et al. | |
| 6,526,242 | B2 | 2/2003 | Kabumoto et al. | |
| 6,550,910 | B2 * | 4/2003 | Hwang | 347/108 |
| 6,557,992 | B1 * | 5/2003 | Dwyer et al. | 347/108 |
| 6,582,139 | B2 * | 6/2003 | Abe et al. | 400/599.1 |
| 6,899,422 | B2 * | 5/2005 | Strowe et al. | 347/108 |
| 7,029,113 | B2 * | 4/2006 | Hwang | 347/108 |
| 7,161,642 | B2 * | 1/2007 | Kim et al. | 349/58 |

* cited by examiner

*Primary Examiner*—Stephen D Meier
*Assistant Examiner*—Leonard S Liang
(74) *Attorney, Agent, or Firm*—Oblon, Spivak, McClelland, Maier & Neustadt, L.L.P.

(57) ABSTRACT

An indicator structure for mounting an indicator representative of desired information to the body of an apparatus, wherein the indicator is made up of a sheet marked with the information in such a manner as to be visible from the outside of the indicator and a single transparent cover covering at least the information such that the information is visible from the outside. The sheet and cover are removably mounted to the body of the apparatus.

11 Claims, 5 Drawing Sheets

INDICATOR MOUNTING STRUCTURE AND IMAGE FORMING APPARATUS INCLUDING THE SAME

BACKGROUND OF THE INVENTION

1. Field of the Invention

The present invention relates to a structure for mounting an emblem-like or similar indicator marked with desired information to the body of an apparatus and a copier, printer, facsimile apparatus, image forming apparatus or similar apparatus including the same.

2. Description of the Background Art

It is a common practice with, e.g., a copier or similar image forming apparatus to mount an indicator representative of the company's name, trademark, popular name or similar information on the front of the apparatus body. Today, the front of the apparatus body, which is conspicuous in appearance, is required not only to simply display necessary information relating to the apparatus, but also to have attractive appearance. Various schemes for meeting such requirements have been proposed in the past. This is also true with a system including a copier or similar image forming apparatus, a sheet feeder, a finisher and other units, as distinguished from a copier constructed as a single unit.

Although conventional indicators representative of the company's name, trademark, popular name or similar information have been improved in design themselves, some problems are still left unsolved as to the entire appearance inclusive of the apparatus body and adaptability to, e.g., the replacement of the type of the apparatus.

SUMMARY OF THE INVENTION

It is an object of the present invention to provide an indicator mounting structure not only showing necessary information but also having attractive appearance and desirable replaceability and a copier, printer, facsimile apparatus or similar image forming apparatus including the same.

In a structure for mounting an indicator representative of desired information to the body of an apparatus of the present invention, the indicator is made up of a sheet marked with the information in such a manner as to be visible from the outside of the indicator and a transparent cover covering at least the information such that the information is visible from the outside. The sheet and cover are removably mounted to the body of the apparatus.

An apparatus including the above indicator mounting structure is also disclosed.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

A preferred embodiment of the structure for mounting an indicator in accordance with the present invention will be described hereinafter. While the illustrative embodiment is applied to a control panel included in an image forming apparatus, the image forming apparatus is only a specific form of an apparatus to which the present invention is applicable.

Figure 1:
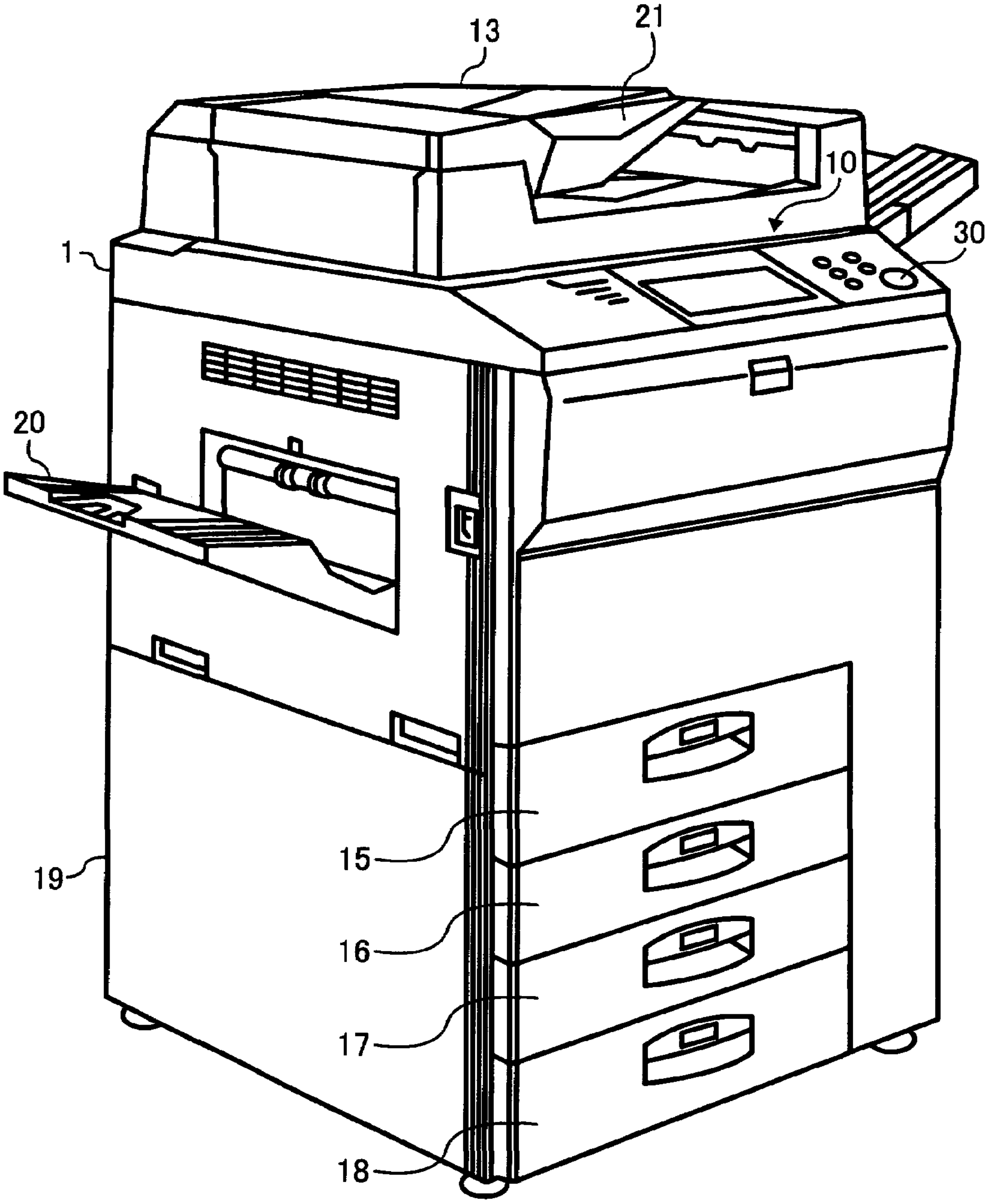
FIG. 1 is an isometric view showing an apparatus embodying the present invention and implemented as a color image forming apparatus by way of example.
Figure 2:
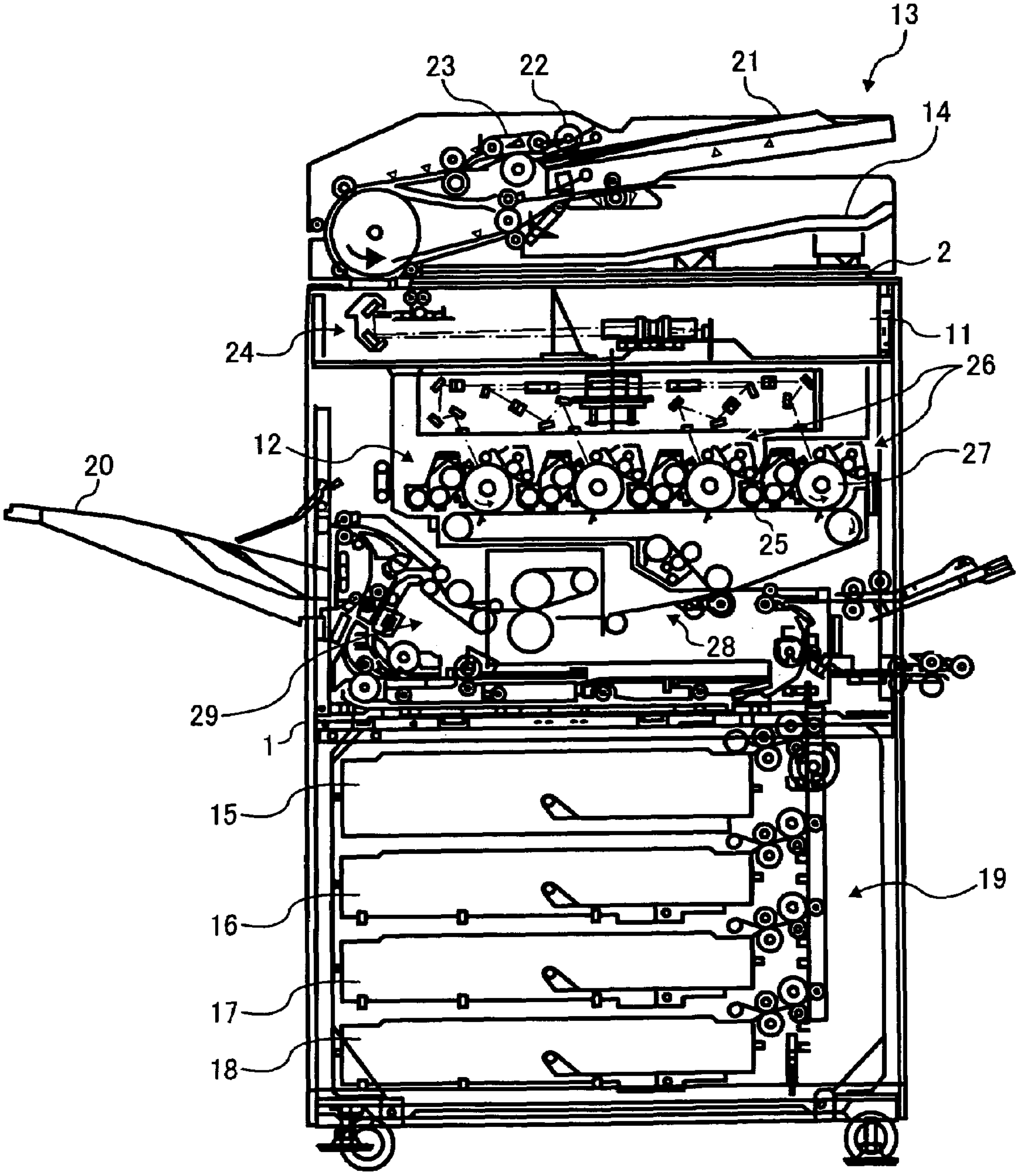
FIG. 2 is a section showing the apparatus of the illustrative embodiment.

FIGS. 1 and 2 show a color image forming apparatus to which the illustrative embodiment is applied in an external view and a section, respectively. The color image forming apparatus is a so-called multifunction machine selectively operable as a copier, a facsimile apparatus, a scanner, a document server box or the like, as will be described more specifically later. As shown, the color image forming apparatus includes an apparatus body or frame 1 including a scanning unit 11 for reading a document, an image forming section 12 for forming images, an ADF (Automatic Document Feeder) 13, a document stack tray 14 for stacking documents sequentially delivered from the ADF 13, a sheet feeding section 19 including sheet cassettes 15 through 18, and a print tray 20 for stacking sheets or prints.

In operation, the operator of the color image forming apparatus sets desired documents, not shown, on a document feed tray 21 included in the ADF 13 and then operates the control panel 10, e.g., pushes a start key 30 positioned on the control panel 10. In response, a pickup roller 22 also included in the ADF 13 is rotated to pay out the top document from the document feed tray 21. The document thus paid out is conveyed by a belt 23 to a glass platen 2 mounted on the top of the scanning unit 11 and stopped on the glass platen 2. The scanning unit 11 includes a reading device 24 positioned between the image forming section 12 and the glass platen 2 for reading the document stopped on the glass platen 2.

The scanning unit 11 includes a light source for illuminating the document positioned on the glass platen 2, optics for focusing the resulting reflection from the document, and a CCD (Charge Coupled Device) image sensor or similar image sensor on which the above reflection is focused. After the scanning unit 11 has read the document image, the document is conveyed from the glass platen 2 to the document stack tray 14.

In the image forming section 12, a plurality of image forming stations 26 are arranged side by side above an endless, intermediate image transfer belt 25. Each image forming station 26 includes a photoconductive drum 27 which is a specific form of an image carrier. Arranged around the photoconductive drum (simply drum hereinafter) 27 are a charger for uniformly charging the surface of the drum 27, an exposing device for scanning the charged surface of the drum 27 with a laser beam to thereby form a latent image, a developing device for developing the latent image with toner, and a cleaning device for removing toner left on the drum 27 after image transfer.

Yellow (Y), magenta (M), cyan (C) and black (BK) are assigned to, e.g., the leftmost image forming station 26 to the rightmost image forming station 26, as viewed in FIG. 2. While the intermediate image transfer belt (simply belt hereinafter) 25 is in rotation, a yellow (Y) toner image is formed first and then transferred to the intermediate image transfer belt 25. Subsequently, a magenta (M) toner image is formed and then transferred to the belt 25 over the yellow toner image. This is followed by forming a cyan (C) toner image and transferring it to the belt 25 and then forming a black (BK) toner image and transferring it to the belt 25, completing a four-color or full-color toner image. The full-color toner image is then transferred from the belt 25 to a sheet fed from the sheet feeding section 19 by an image transferring device 28. After the toner image thus transferred to the sheet has been fixed by a fixing device 29, the sheet or print is driven out to the print tray 20. The apparatus additionally includes a duplex printing section although not shown specifically.

Figure 3A:
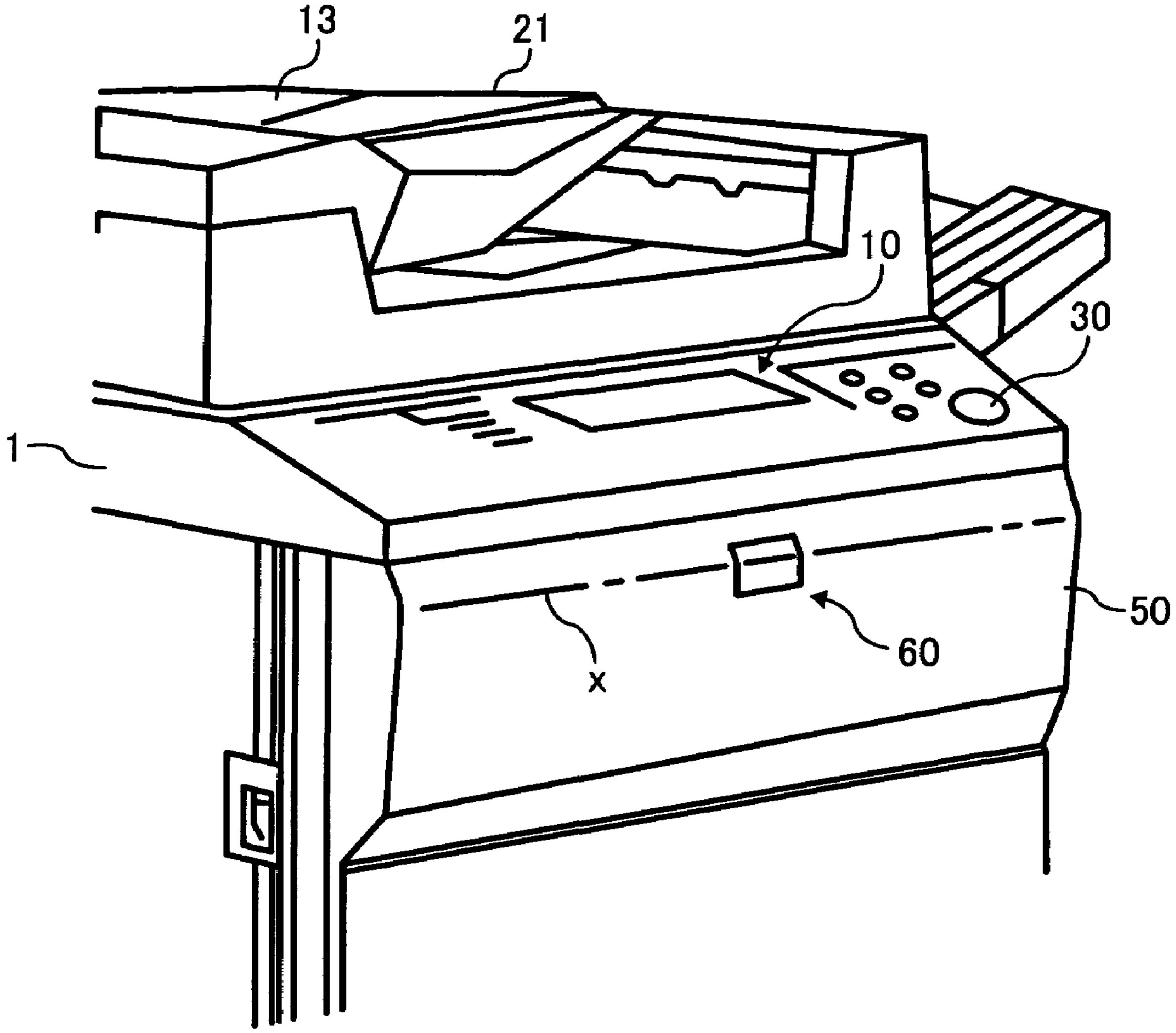
FIG. 3A is an enlarged external view showing an image forming apparatus to which an indicator mounting structure also embodying the present invention is mounted.

As shown in FIG. 3A, the indicator mounting structure of the illustrative embodiment includes an emblem-like or similar indicator 60 positioned at substantially the center of a front panel 50, which forms part of the apparatus body 1. The indicator 60 shows desired information relating to the image forming apparatus.

The indicator 60 includes a sheet 61 on which desired information readable from the outside is printed or otherwise marked. A cover 62 covers the sheet 61 from the outside of the apparatus body 1 while pressing it against the apparatus body 1. The cover 62 is formed of a transparent or a semitransparent material to allow the information provided on the sheet 61 to be seen therethrough and is removable from the front panel 50, as will be described more specifically later.

Figure 3B:
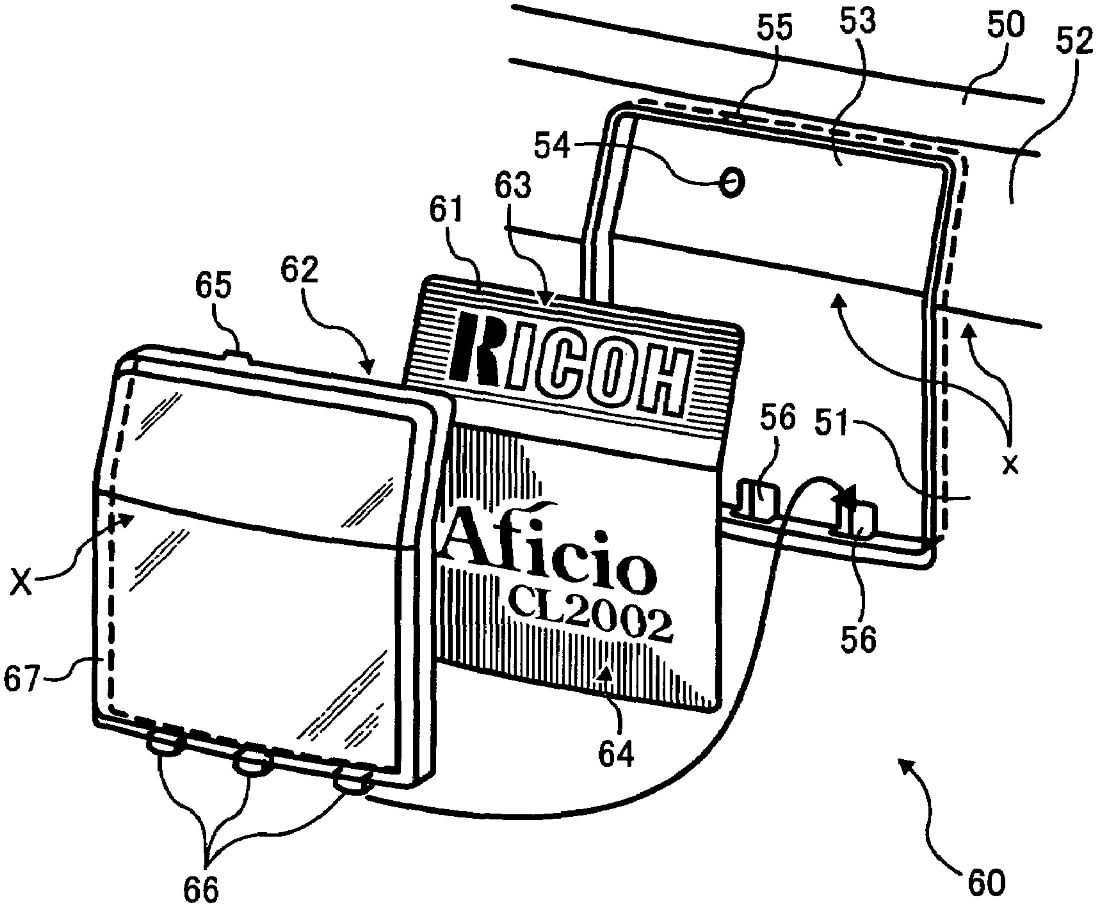
FIG. 3B is an exploded perspective view of the indicator mounting structure shown in FIG. 3A.

Assuming first that the apparatus body 1 is held in a horizontal position, the front panel 50, forming part of the apparatus body 1, thus forms a bent surface bent in the horizontal direction via the position where the indicator 60 is located. Of course, the bent surface does not have to be entirely bent in the direction of thickness of the front panel 50, i.e., in the front-and-back direction, but should only be bent when seen from the outside. In FIG. 3*b*, the bent surface has an apex x.

More specifically, the bent surface of the front panel 50 is made up of at least two surfaces. In the illustrative embodiment, the bent surface is made up of two surfaces 51 and 52 by way of example. In any case, at least one of the surfaces constituting the bent surface is angled upward relative to a vertical plane on the assumption that the apparatus body 1 is held in a horizontal position. In the illustrative embodiment, the lower surface 51 is angled slightly downward relative to a vertical plane such that a line perpendicular to the lower surface 51 is angled downward relative to a horizontal plane while the upper surface 52 is angled obliquely upward such that a line perpendicular to the upper surface 52 is angled obliquely upward relative to a horizontal plane.

A recess 53, open to the outside, is formed in the front panel 50. After the sheet 61 has been positioned in the recess 53, the cover 62 is mounted to the apparatus body 1 in such a manner as to cover the sheet 61. The bottom wall of the recess 53 is also formed with a bend which is, of course, continuous with the bend of the bent surface forming part of the front panel 50, as illustrated. A small hole 54 is formed in the bottom of the recess 53 to allow, e.g., a pin to be inserted therein from the back of the hole 54, i.e., from the inside of the apparatus body 1 for pushing the sheet 61 and cover 62 out of the recess 53.

Figure 4:
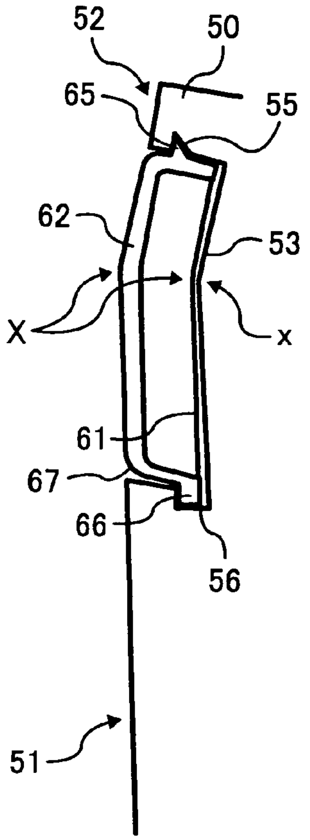
FIG. 4 is a sectional side elevation of the indicator mounting structure shown in FIG. 3B.

The outer surface of the cover 62 is also implemented as a bent surface having an apex X corresponding in configuration to the apex x. The difference is that the cover 62 is entirely bent, inclusive of the outer surface, in the direction of thickness. More specifically, as shown in FIG. 4, the inner surface of the cover 62 is also implemented as a bent surface. While the sheet 61 is shown as being bent and also provided with the same apex X as the cover 62, the bend of the sheet 61 is formed by the cover 62 that presses the sheet 61 against the bottom of the recess 53. Of course, the bend of the sheet 61 may be formed beforehand, if desired. In any case, particular information may be, e.g., printed on each of the two portions of the sheet 61 above and below the apex X, respectively. In the illustrative embodiment, as shown in FIG. 3, a mark 63 representative of a company's name and a mark 64 representative of the popular name or the type of the image forming apparatus are, e.g., printed on the upper portion and lower portion of the sheet 61, respectively. The sheet 61 may be formed of either one of a transparent and a semitransparent material.

The upper mark 63 of the sheet 61, facing the upper surface 52 of the front panel 50 when the sheet 61 is mounted, can be easily seen and therefore attracts attention not only of a person standing in front of the apparatus body 1 but also persons around the apparatus body 1. Although the lower mark 64 is less conspicuous than the upper mark 63, the upper mark 63, standing conspicuous to persons around the apparatus body 1, allows even the lower mark 64 to draw attention. This allows a person to easily see the presence of two different kinds of information on the sheet 61, realizing effective indication.

Further, a concavity 55 is formed in the portion of the upper edge of the recess 53 slightly close to one end while a projection 65 is formed on the upper edge of the cover 62 corresponding in position to the concavity 55. The concavity 55 and projection 65 are mated together to mount the upper portion of the cover 62 to the apparatus body 1. Also, three holes 56, which may be bottomed or not, each are formed from the lower edge of the recess 53 to the portion of the bottom contiguous therewith although only two holes 56 are shown in FIG. 3B. Three projections 66, corresponding in position to the holes 56, protrude from the lower edge of the cover 62. The projections 66 are mated with the holes 56 when the cover 62 is mounted to the recess 53 of the apparatus body 1.

The bottomed or non-bottom holes 56, extended from the lower edge to the bottom of the recess 53 each, are advantageous over holes not extended to the bottom of the recess 53 in that they are provided with a large area each. This allows the size of each projection 66 of the cover 62 to be also increased for thereby promoting easy mounting and dismounting of the cover 62 from the recess 66.

Figure 5:
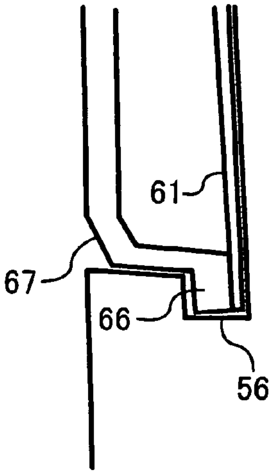
FIG. 5 is a sectional side elevation showing part of a chamfered outer edge included in a cover that forms part of an indicator.

As shown in FIG. 5, in the illustrative embodiment, the outer edges 67 of the cover 62 all are chamfered. A series of experiments showed that the chamfered outer edges 67 rendered the projections 66 fitted in the holes 56 inconspicuous or practically invisible from the outside in cooperation with the material of the cover 62, e.g., PC or similar transparent or semitransparent plastic, contributing a great deal to the improvement of appearance of the apparatus. It is to be noted that the bend stated earlier is extended to the outer edges 67 and ridges positioned on the inside of the edges 67.

In summary, it will be seen that the present invention provides an indicator mounting structure providing an apparatus on which it is mounted with attractive appearance and allowing an indicator to be easily mounted to or dismounted from the apparatus and an image forming apparatus or similar apparatus including the same.

Various modifications will become possible for those skilled in the art after receiving the teachings of the present disclosure without departing from the scope thereof.

What is claimed is:

1. An indicator structure in a body of an apparatus comprising:

a body portion of the apparatus provided with a recessed portion, a base of the recessed portion comprising first and second substantially planar surfaces, the surfaces of the base being inclined at different angles so as to intersect to form a first apex therebetween, wherein a hole is formed in an outer surface of at least one of the first and second substantially planar surfaces and is completely surrounded by and extends through the at least one of the first and second substantially planar surfaces to an interior of the body of the apparatus;

a cover which is transparent and mountable to the recessed portion and comprising first and second substantially planar surfaces, the surfaces of the cover being inclined at different angles so as to form a second apex therebetween, the second apex substantially coinciding with the first apex when the cover is mounted to the recessed portion; and a sheet of flexible material dimensioned to fit between the recessed portion and the cover, the sheet including first and second indicia positioned thereon such that the first indicia is located over the first substantially planar surface of the base of the recessed portion and the second indicia is located over the second substantially planar surface of the base of the recessed portion when the sheet is fitted in the recessed portion, wherein the sheet of flexible material covers the hole in the base of the recessed portion.

2. The indicator structure as claimed in claim 1, wherein the cover is removably attached to the recessed portion.

3. The indicator structure as claimed in claim 2, wherein the cover is formed with at least one projection and the recessed portion of the base is formed with at least one receiving portion that receives the at least one projection when the cover is attached to the recessed portion.

4. The indicator structure as claimed in claim 3, wherein the at least one projection of the cover is press fit into the at least one receiving portion of the recessed portion of the base.

5. The indicator structure as claimed in claim 2, wherein the cover is formed with at least two projections and the recessed portion of the base is formed with at least two receiving portions that respectively receive the projections when the cover is attached to the recessed portion.

6. The indicator structure as claimed in claim 1, wherein at least one of the respective first and second substantially planar surfaces of the cover comprises a rectangle, and at least one of the respective first and second substantially planar surfaces of the recessed portion comprises a rectangle.

7. The indicator structure as claimed in claim 6, wherein each of the respective first and second substantially planar surfaces of the cover comprises a rectangle, and each of the respective first and second substantially planar surfaces of the recessed portion comprises a rectangle.

8. The indicator structure as claimed in claim 1, wherein the apparatus comprises an image forming apparatus.

9. The indicator structure as claimed in claim 1, wherein the cover is semitransparent.

10. The indicator structure as claimed in claim 1, wherein the sheet of flexible material comprises paper.

11. An indicator structure as claimed in claim 1, wherein the hole in the base of the recessed portion is formed in only one of the first and second substantially planar surfaces.

* * * * *